United States Patent [19]
Sasaki et al.

[11] Patent Number: 5,359,615
[45] Date of Patent: Oct. 25, 1994

[54] METHOD FOR FORMING MICROILLUMINANTS

[75] Inventors: Keiji Sasaki, Kyoto; Hiroaki Misawa, Takatsuki; Ryo Fujisawa, Uji; Noboru Kitamura, Kyoto, all of Japan

[73] Assignee: Research Development Corporation of Japan, Tokyo, Japan

[21] Appl. No.: 980,169

[22] Filed: Nov. 23, 1992

[30] Foreign Application Priority Data

Nov. 21, 1991 [JP] Japan .................. 3-306432

[51] Int. Cl.$^5$ .................. H01S 3/14
[52] U.S. Cl. .................. 372/39; 372/69; 372/51; 372/70
[58] Field of Search .................. 372/69, 70, 53, 54, 372/29, 51

[56] References Cited

U.S. PATENT DOCUMENTS 4,853,937  8/1989  Rinke et al. .................. 372/53

*Primary Examiner*—Leon Scott, Jr.
*Attorney, Agent, or Firm*—Wenderoth, Lind & Ponack

[57] ABSTRACT

A method for forming microilluminants, which comprises the steps of irradiating laser beam to microparticles doped with a laser pigment in a liquid medium, trapping the microparticles and causing these microparticles to emit light.

According to this method, it is possible to form microilluminants, permitting application to new physical and chemical processes and to processing and modification of microparticles, and new developments such as optical STM.

2 Claims, 7 Drawing Sheets

Fig. 1

(PSt size : 1 μm
PMMA size : 1 μm
Liquid film concentration : 5×10⁻³ mol/l
ex. 1064 nm
Laser power : 0.725 W)

Fig. 2

(Crystal grain size: 7×13 μm
ex. 1064nm
Laser power : 0.18W)

Fig. 3

$$\begin{pmatrix} \text{Concentration} : 2\times10^{-3} \text{ mol/l} \\ \text{ex. } 1064 \text{ nm} \\ \text{Laser power} : 0.36 \text{ W} \end{pmatrix}$$

532 nm irradiation

Fluorescent (pumping) intensity

METHOD FOR FORMING MICROILLUMINANTS

FIELD OF THE INVENTION

The present invention relates to a method for forming microilluminants. More particularly, the present invention relates to a method for forming and applying microilluminants useful in various areas including physical and chemical processes and electronics as a novel method for manipulating microparticles.

PRIOR ART

The laser trapping method comprising trapping microparticles by irradiating a laser has conventionally been known, and the inventors of the present invention made it possible to make the laser trapping method more sophisticated by permitting non-contact and non-destructive free-handling manipulation of microparticles of the micrometer order.

In such laser trapping, a light having an energy of several tens to several hundred $MW/cm^2$ is irradiated to microparticles, and this type of system is expected to cause easy occurrence of nonlinear chemistry. More specifically, as compared with the case where a cm-order container is used, it would be possible to more easily create such an ultimate state in a $\mu m$-space. This is one of the important features of microchemistry, and it is possible to accelerate chemical reactions unique to micrometer by its utilization.

From the above-mentioned point of view the present inventors have examined a more advanced application of manipulation of microparticles Using a laser beam and expansion of the scope of its application. As a result, several new techniques have been developed, and in the course of this examination, formation of microilluminants of microparticles has been posed as an important problem.

Because, if a microilluminant of the micrometer order is available and it has a high coherence (monocrome) as a laser, this could be an important technology in building a microchemistry plant. In the area of optical measurement, furthermore, as in photon STM (NSOM), active research efforts are made on techniques limiting the light within a microspace under the wavelength, and microilluminants may be applicable also to such techniques. As an example of research on such microilluminants, some reports have recently been made on pigment laser emission in polymer latex microparticles in the form of liquid drops. In this phenomenon, $\mu m$-order spheres become cavities and laser oscillation occurs in a mode known as Whispering Gallery.

It is Mie's paper, i.e., Mie scattering theory released at the beginning of the twentieth century that introduced the theory of electromagnetic field in microdielectric spheres as associated with such microilluminants. Immediately after that, Debye derived a force (emission power) of electromagnetic field exerted on microdielectric spheres from a similar theory. This later formed the basic theory suggesting the presence of a ripple structure in the particle size and wavelength dependency of laser trapping force, as discovered by Ashkin (similar to the Whispering Gallery mode). More recently, Rayleigh named it the Whispering-Gallery mode. In the area of microparticle laser oscillation, this theory is called Rayleigh theory, Mie-Debye theory of Lorenz-Mie theory.

Garrett et al. of the Bell Laboratories showed by experiment laser oscillation of microspheres on the basis of this theory in 1961. They used $CaF_2:Sm^{+1}$ crystals polished into spheres of several mm (not $\mu m$) as samples (in liquid hydrogen), and a high-voltage xenon flash lamp (peak power: $50W/cm^2$) as the pomping light. They confirmed that this was a stimulated emission because of the dependency of the luminous intensity on the intensity of pumping light. Their experiment was really an excellent one, and it is not known why no further experiments have followed theirs. It was in the latter half of the 1970s when laser became popular that this subject attracted again the general attention. Many reports on the subject have been released since then. It is first experimentally shown that the fluorescence spectra doped on spheric microparticles having a particle size of several tens of $\mu m$ had a mode structure based on resonance.

The mode structure of cylindrical fibre similar to the above has also been measured. However, this itself is the mode structure of a natural emitted light, being identical with fluorescence as observed simply through etalon, not laser oscillation (stimulated emission ). It was in the paper by Tzeng et al. in 1984 that reported for the first time laser oscillation as to $\mu m$-order microparticles. Their specimens were liquid ethanol drops (in the open air) containing Rhodamine B6G ($10^{-4}-10^{-3}M$). These liquid drops were prepared through a vibrating orifice, and the particle size was adjusted by acting on the number of vibrations. In their experiment, microparticles having particles sizes of up to 60 $\mu m$ were used and the pumping light was argon ion laser (514.5 nm), emitted through an iris reduced to 200 $\mu m$. Measurement of the individual drops was effected while pumping liquid drops falling down in succession at a certain timing. They confirmed the occurrence of stimulated emission from their observation of the dependency of the intensity ratio of the mode peak intensity to that of the backland (natural emitted light) upon the pumping light intensity, and relaxation oscillation as observed through time-division measurement of the $\mu sec$ order. The date in this report however seem to have contained not only laser oscillation of pigment, but also stimulated Raman scattering of ethanol. Soon after the release of the report, actually, stimulated Raman scattering for microdrops (alcohol or water) (stimulated emission) caused by feedback through microsphere cavities) has been reported. This has also a clear mode structure which is deemed to be a kind of Raman laser.

With regard to pigment laser oscillation, Lin et al. later investigated the dependency of laser oscillation spectra on the particle size (water drops containing Rhodamine 590 ($10^{-4}31$ $10^{-3}M$), 40–60 $\mu m$, Q-switched YAG 523 nm, 20 ns) and Qian et al. observed the state of laser oscillation in the form of photos. Furthermore, Biswas et al. clearly observed relaxation oscillation through time-division measurement of the nsec order. Regarding stimulated Raman scattering, on the other hand, Qian et al. measured liquid $CCl_4$ drops. Time-division measurement of the nsec order had already been conducted by means of pigment laser oscillation. Research efforts on stimulated Raman scattering of microdrops have actively been made even after 1990, without however a remarkable progress.

Thus far, however, all the released reports cover measurement of liquid drops in the air except for the measurement of natural emitted light (fluorescence). These research efforts, thought being important in the scientific significance, are quite insufficient with a view to applying as a practical technique or ensuring further development. Confirmation alone of illumination of liquid drops in the air and laser oscillation is not sufficient at all for the application thereof as a method for manipulating microparticles or application thereof to photon STM.

SUMMARY OF THE INVENTION

The present invention was made in view of the status of the conventional research and development efforts and has an object to promote development of a method for laser manipulation of microparticles and to provide a novel method for forming microilluminants useful in the application to a field of microreactions and a method for manipulating microparticles using such a method for forming microilluminants.

As a solution to the above-mentioned problem, the present invention provides a method for forming a microilluminant, which comprises irradiating laser beam to microparticles doped with a pigment, and trapping the same to cause the same to illuminate.

The present invention provides also a method for three-dimensional manipulation of microparticles with the use of illuminant microparticles, along with laser oscillation caused by the above-mentioned method, and conducting processing and modification of microparticles by irradiating light to other microparticles.

DETAILED DESCRIPTION OF THE INVENTION

The present invention comprises previously doping a laser pigment to microparticles placed in a liquid solvent comprising water, an organic compound and mixture thereof, and trapping these microparticles doped with the laser pigment by irradiating laser beam thereto to cause illumination thereof.

In this case, the microparticles may be handled as a plurality of groups, in any combination of microparticles doped with the laser pigment and those not doped therewith. There is no particular limitation in the type of microparticles, and any microparticles capable of being doped with a pigment may be used.

Microilluminants formed in the present invention can be used for physical or chemical conversion or modification of other coexisting microparticles, and are applicable to a display element, a photo element and other electronic devices, as well as to photon STM. An organic substance, a biogenous cell or a virus may be employed as microparticles.

Illumination may be accomplished either only by irradiation of trapping laser beam or by additional irradiation of another laser beam such as pulse laser in the trapped state.

Various embodiments are possible by the appropriate selection of a kind of laser beam, power thereof, manner of irradiation, and a kind of pigment.

Now, the present Invention will be described further in detail by means of examples.

EXAMPLE 1

Figure 1:
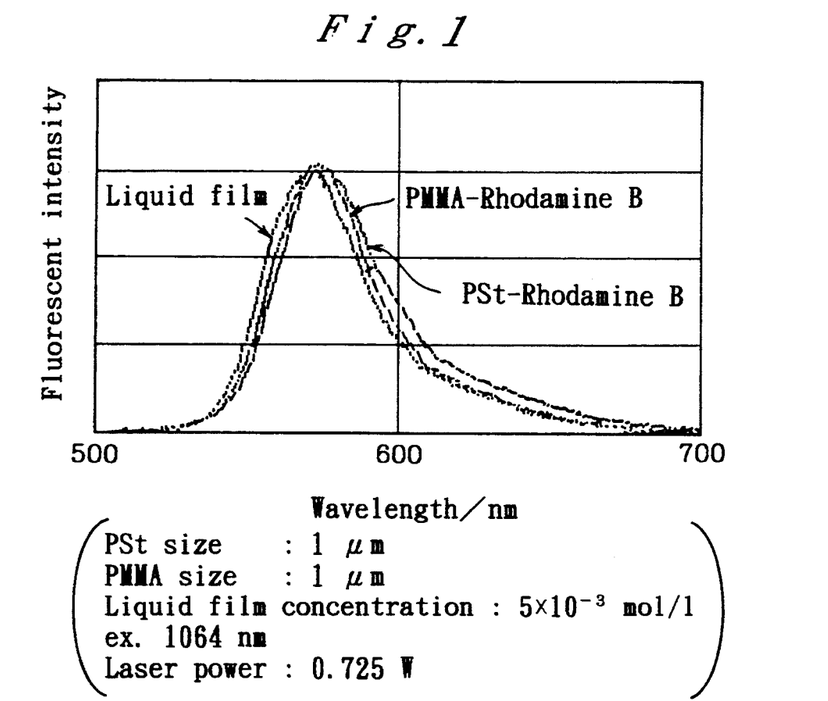
FIG. 1 is an illumination spectral diagram upon trapping microparticles based on CWYAG laser as an embodiment of the present invention.
Figure 2:
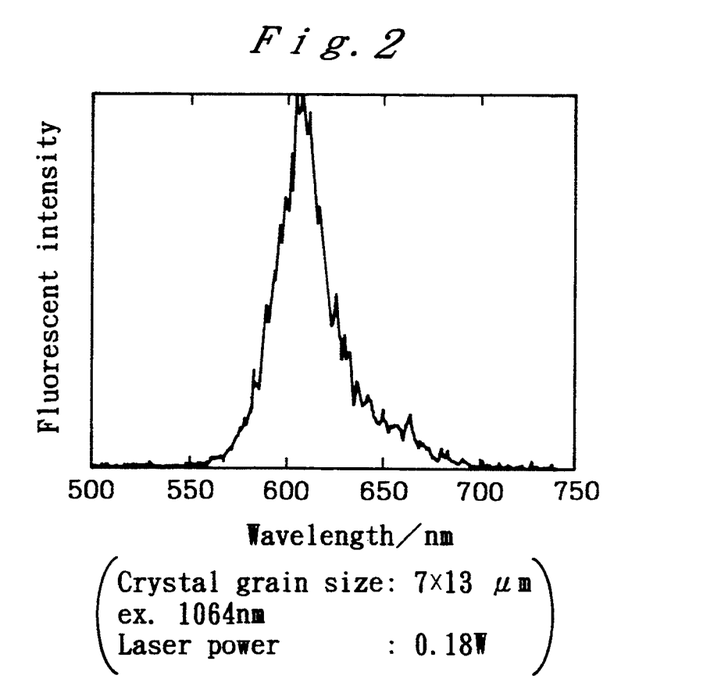
FIG. 2 is an illumination spectral diagram of Rhodamine B microcrystal as a reference.
Figure 3:
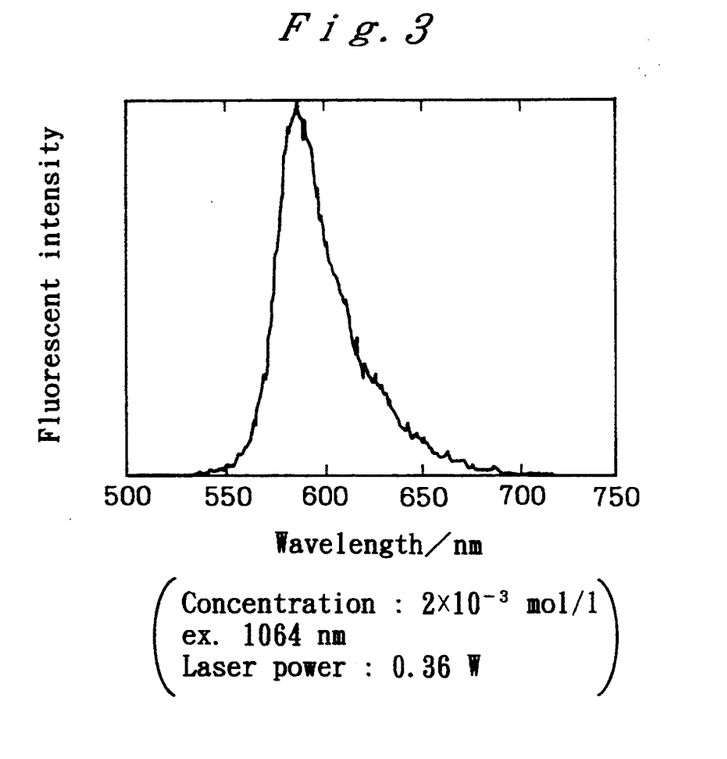
FIG. 3 is an illumination spectral diagram of ethylene glycol liquid film of Rhodamine B as a reference.

Macromolecular microparticles doped with a laser pigment were prepared by the following technique. More specifically, the applied technique of preparation consisted of first preparing MeOH solution of Rhodamine B (counter-ion of which is a chloride), immersing polystyrene (Pst) or polymethylmethacrylate (PMMA) latex particles in the solution, the concentration of the Rhodamine B solution being saturated solution (up to about $10^{-1}$M) for Pst, and $2 \times 10^{-2}$M for PMMA, filtering the microparticles through a microbore filter, sufficiently washing them with water, and then dispersing the microparticles in distilled water. Laser microparticles manipulation was accomplished by means of two types of apparatus. An apparatus used a Princeton Instrument's SMA as the detector. Because CWYAG laser, the light source, had no annexed stabilizer, the laser beam intensity showed slight fluctuations. Another apparatus employed a diode array known as PMA-10 of Hamamatsu Photonix Co. as the detector, and as CWYAG laser serving as the light source had an annexed stabilizer, the laser beam intensity showed almost no fluctuation. The intensity of laser irradiated to the microparticles was corrected to calculate the value of actual irradiation to each of the microparticles. Illumination was observed when PSt and PMMA latex microparticles doped with Rhodamine B were trapped with an intensity of laser beam of 0.73 W (1064 nm). This illumination is illustrated in FIG. 1. It was confirmed that this illumination had a spectrum similar to that caused by 1064 nm excitation using Rhodamine B microcrystal graines or the liquid film of ethylene glycol solution of Rhodamine B (not laser trapping) (FIGS. 2 and 3): this illumination, having no vibration structure intrinsic to laser oscillation, is concluded to be natural emitted light.

Figure 4:
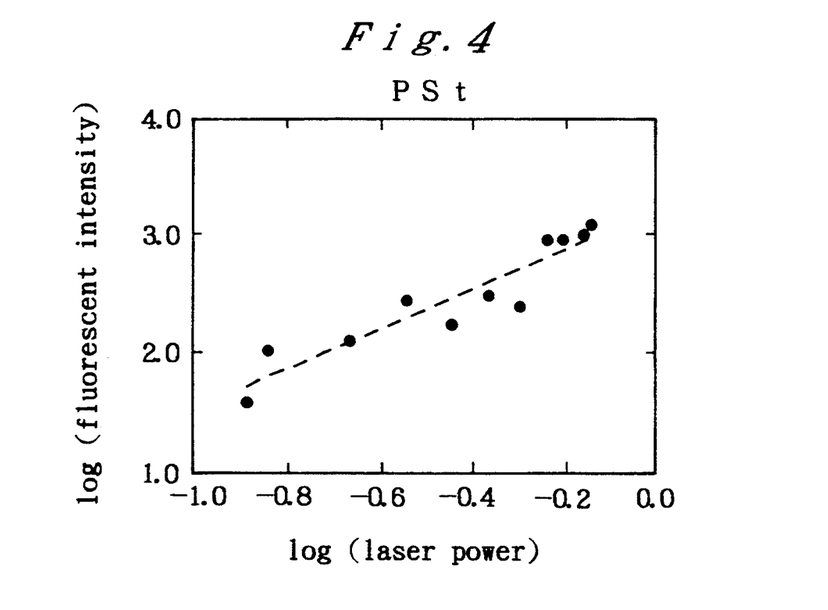
FIG. 4 is a graph illustrating the correlation between the luminous intensity of polyethylene particles and the FIG. 5 is a graph illustrating the correlation between the luminous intensity of PMMA particles and the intensity of trapping laser beam.
Figure 5:
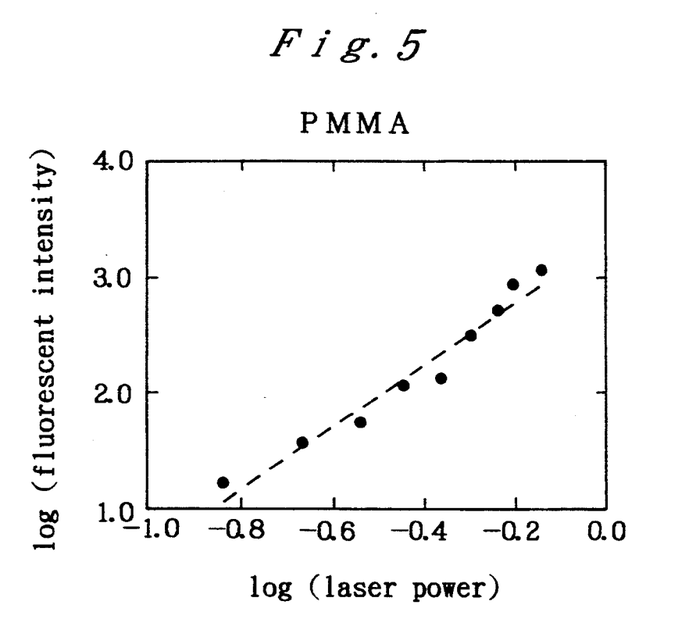

The dependency of this luminous intensity on the intensity of trapping laser beam is illustrated in FIGS. 4 and 5. Dual-logarithmic plots for cases using PSt and PMMA show a slope of a value close to 2 in the both cases. It is therefore conjectured that simultaneous absorption of two photons causes production of Rhodamine B in the excited singlet state, which is emitting the light. Observation of illumination of PSt and PMMA latex microparticles doped with Rhodamine B with difference particle sizes suggested that, for Pst, a larger particle size resulted in a lower luminous intensity thereof. Microscopic observation permitted easy visual confirmation of illumination from those having a particle size of 1 μm, but the confirmation was rather difficult for those having a particle size of 3 or 10 μm. This is attributable to the fact that, because the counter-ion of Rhodamine B is a chloride, it cannot be doped well in PSt having a high hydrophobicity and only the surface and portions adjacent thereto are doped. In the case of PMMA, the luminous intensity tends to be higher according as the particle size becomes larger, and Rhodamine B is considered to be uniformly doped into the interior of individual particles.

It was thus clarified that, in a micrometer-sized space, it was possible to observe the nonlinear phenomenon caused by simultaneous absorption of two photons even by using CW laser. This phenomenon can be applied not only to illumination but also to material conversion.

Figure 6:
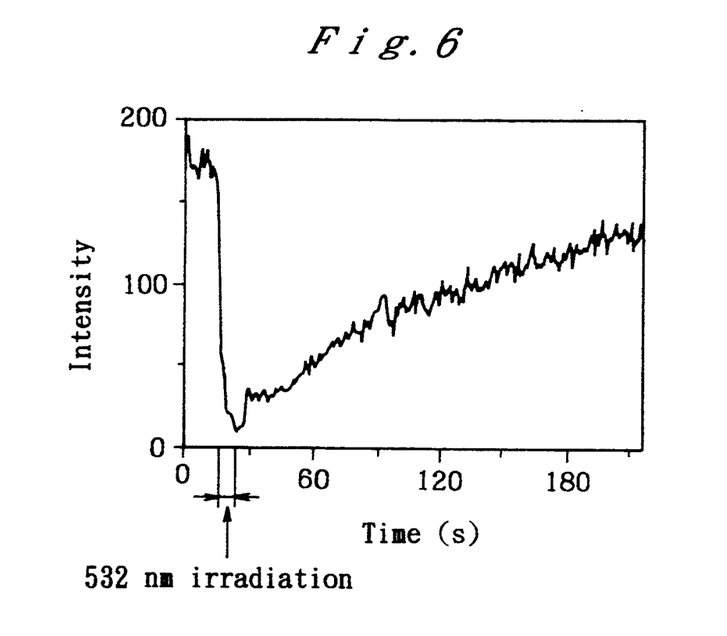
FIG. 6 is a graph illustrating the correlation between the luminous intensity of PMMA latex microparticles trapped by trapping laser beam, as irradiated with ps pulse laser and the time.

Under conditions under which illumination could be observed with trapping laser alone, ps pulse laser (532 nm) was irradiated to trapping macromolecular microparticles while avoiding excessive condensation. When using PMMA latex microparticles, the observed illumination suddenly loses the intensity thereof by the irradiation of 532 nm light (FIG. 6). Upon stoppage of irradiation of 532 nm pulse laser, however, illumination slowly recovers the original state. When using Pst, on the other hand, irradiation of 532 nm pulse laser caused the luminous intensity once to increase and then immediately decrease, and even by discontinuing irradiation of pulse laser, there was almost no recovery of the luminous intensity. This phenomenon may be considered as follows. In the both cases of PMMA and PSt, irradiation of 532 nm and 1064 nm laser beams causes production of highly excited state of Rhodamine B, resulting in photodissociation; 532 nm ps pulse laser beam is considered to switch on the dissociation reaction of Rhodamine B. Recovery of illumination after stoppage of pulse laser irradiation in the case of PMMA may be the observation of diffusion process of new Rhodamine molecules to this pigment dissociation reaction zone. Since it is hard for Rhodamine B to diffuse in the case of PSt, new Rhodamine B molecules are considered not to diffuse into the photodissociated zone.

EXAMPLE 2

Figure 7:
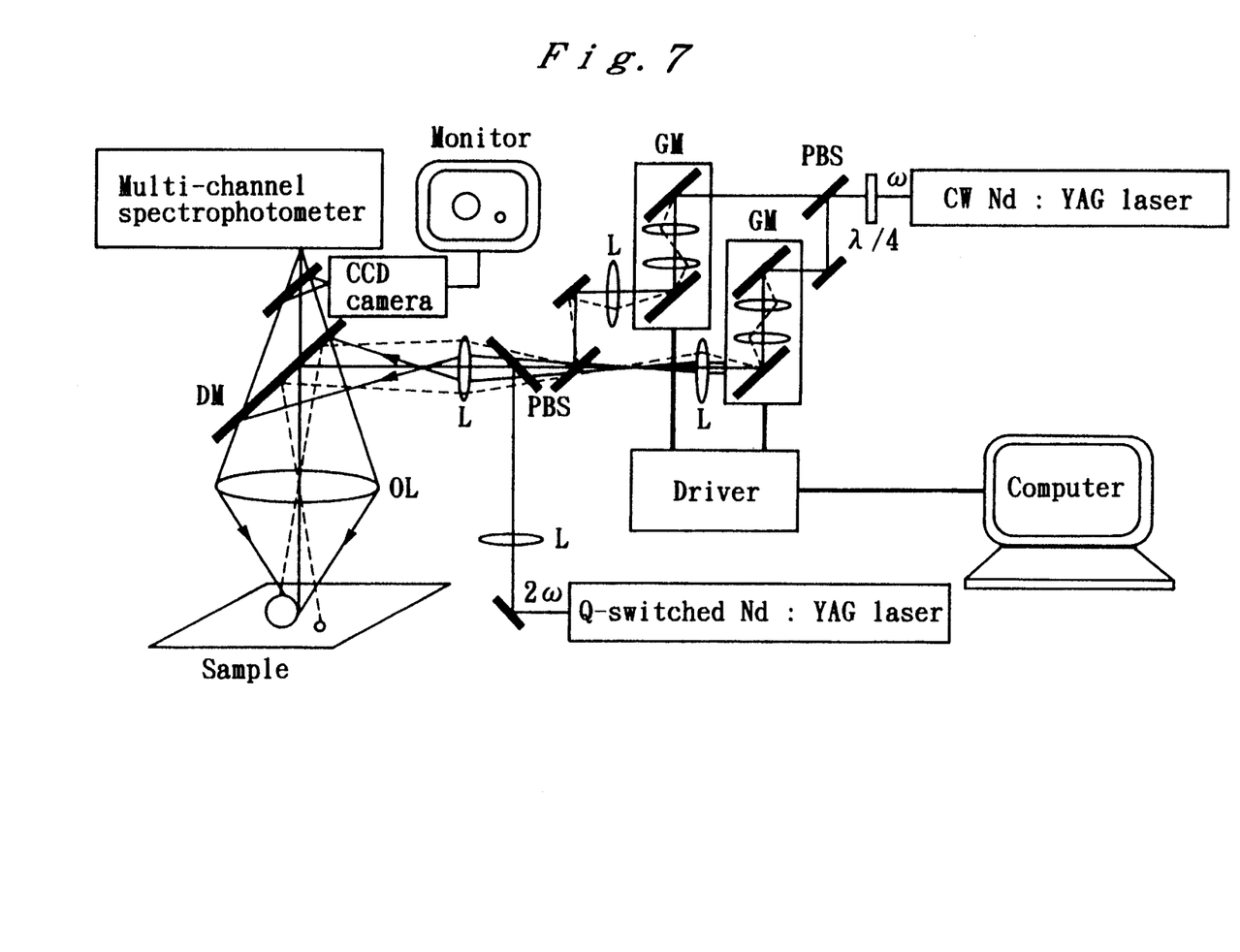
FIG. 7 is a view illustrating the apparatus used for microparticles laser oscillation of the present invention.

FIG. 7 illustrates the configuration of the experimental system. Second harmonic component of Q-switched ND:YAG laser (532 nm, up to 30 ps, −10 mJ/pulse, 10 Hz) was employed as the laser beam for pumping. This laser beam was introduced onto a microscope (Nikon Optiphot XF), and the beam was condensed on microparticles through an objective (×40, NA=0.85). In this condensation of beam, a defocused state was maintained by shifting the focal position so that an entire microparticle might be illuminated uniformly. The illumination from the microparticles were collected onto a pinhole on the image forming surface by means of the objective, and the spectrum was measured with a high-sensitivity multi-channel spectrophotometer (Hamamatsu Photonix, PMA 10, built-in 2-stage MCP, resolution: up to 2 nm). CWNd:YAG laser (Spectron SL902T, wavelength: 1064 nm, linear polarization) was used as the trapping laser beam. This laser beam was converted into a circular polarized beam through a λ/4 plate and splitted into two beams by means of a polarized beam slitter. These two beams were polarized to two axial directions with two respective galvanomirros (GSZ Q325DT), and then gathered along a single axis with the polarized beam slitter. These laser beams were introduced onto the microscope coaxially with the laser beam for pumping and condensed on the sample. The condensation spot had a size of up to 1 μm. It was possible to freely move the two condensation spots on the sample surface by acting on the galvanomirrors controlled by a computer (NEC PC9801RA), and to observe the microparticle laser oscillation through a CCD camera and a video recorder.

The sample was prepared by immersing PMMA latex (particle size: 5 to 30 μm) into methanol solution of Rhodamine B ($1 \times 10^{-2}$M) for a night, then repeating water washing while filtering, and drying same to sufficiently remove methanol. The thus prepared sample was dispersed in water, and the dispersed solution was dropped onto a sliding glass into a liquid film with a cover glass and a 170 μm spacer for measurement.

Actually, when three-dimensionally trapping a microparticle having a particle size of 25 μm with a single trapping beam and pumping it, it is confirmed that the edge of the sphere shines sharply in addition to the dimly shining fluorescence, and the center portion is somewhat dark. This is attributed to the fact that, because the oscillating laser beam is emitted tangentially to the sphere, the edge portion is observed to strongly shine. This phenomenon is similar also to laser oscillation of liquid drops in the air, and this permits sufficient confirmation of the cavity effect. The key to the successful laser oscillation in water is considered to lie in the use of the laser with ps of a high peak power. The reports so far released describe pumping by ns laser with a power of 0.1 to 1 GW/cm$^2$, whereas, in the present experiment, a power of >1TW/cm$^2$ is irradiated. This could allow a microsphere cavity in water with a low Q-value to exceed the threshold value.

Figure 8:
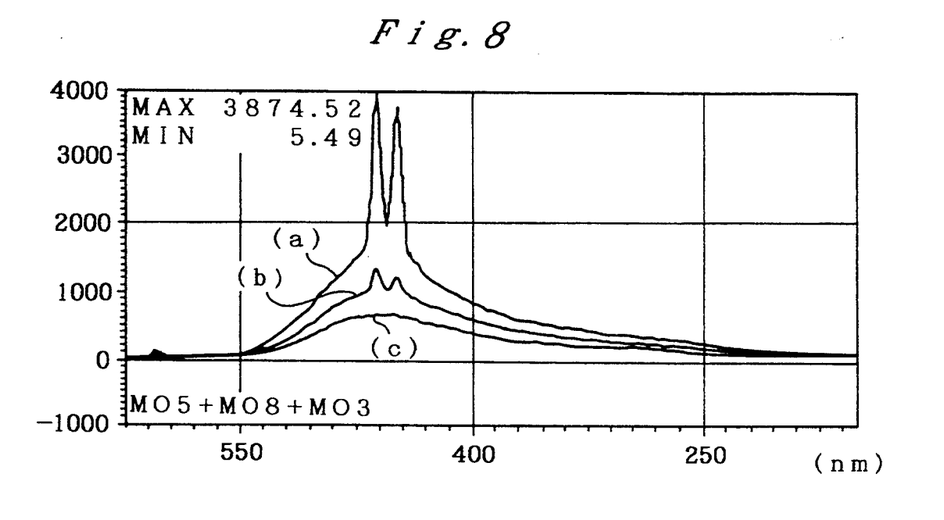
FIG. 8 is a spectral diagram concerning laser oscillation.

FIG. B(a) illustrated the spectrum of a microparticle having a particle size of 17 μm. Two mode peaks are clearly observed (the real peaks should be thinner, but the spectrometer had a resolution not so high). The wave interval, Δλ, of the mode peaks is theoretically derived from:

$$\Delta\lambda = \lambda^2 \mathrm{Tan}^{-1} X / 2\pi r n_2 X \quad (1)$$

$$x = [(n_1/n_2)^2 - 1]^{\frac{1}{2}} \quad (2)$$

where λ is the wavelength; r is the radius of particle; and $n_1$ and $n_2$ are the respective refracture indices of the particle and the medium (however, eq.(1) is an approximate formula for the case of $2m_2/\lambda \gg 1$). Calculation of this formula gives a value of Δλ of 4.4 nm, which very well agrees with the peak interval of 4.3 shown in FIG. 8.

Figure 9:
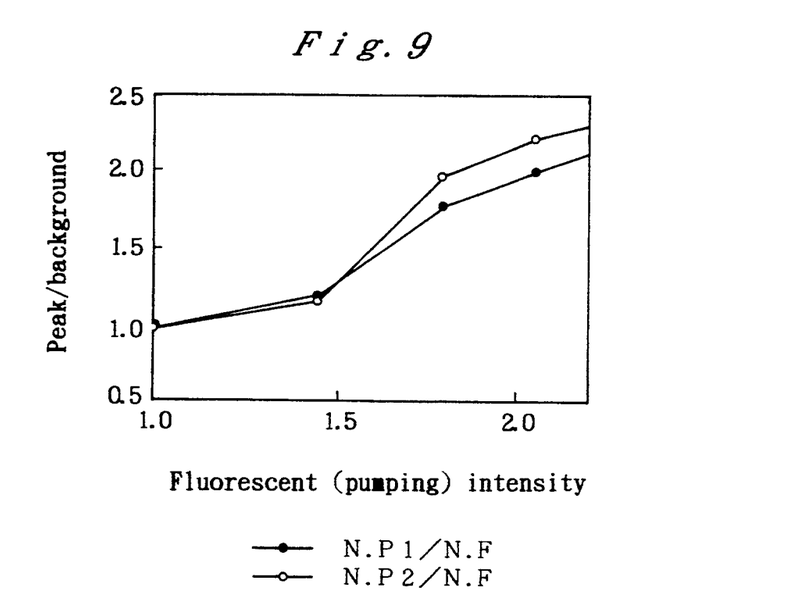
FIG. 9 is a graph illustrating the correlation between the luminous intensity and the intensity ratio for two mode peaks.

Then, the dependency of illumination upon the pumping light power was observed for the purpose of confirming that this was not the cavity effect (for example, passage of ordinary fluorescence results in a mode structure) caused by natural emitted light, but laser oscillation. FIG. 8 (b) and (c) represent the results of observation of spectrum of the same microparticles with altered values of pumping light power. If the tested illumination consists only of natural emitted light, the shape of spectrum should not be dependent on the pumping light power; in these graphs, the relative intensity of mode peaks increases with the pumping light power. In FIG. 9, values of the ratio of intensity of the two mode peaks to that (I) of the portion without a mode structure in FIG. 8 are plotted as a function of I. Provided however that the plots are normalized with the minimum value. While a natural emitted light should give a constant value of this ratio (irrespective of what the abscissa represents), the ratio largely varies with the pumping power intensity. These results suggest that the illumination is caused by laser oscillation.

When a microparticle of a particle size of 17 $\mu$m oscillating laser (different from the shown in FIG. 8) and a microparticle not oscillating laser having a particle size of 10 $\mu$m are trapped with two beams, it is confirmed that the entire periphery does not shine, but two points symmetrical relative to the center are shining. This is considered to be due to the direction of incidence of the pumping light. In this case, a cavity is considered to be formed on the circumference of the cross-section passing through the two shining points. Although the entire particle would shine by increasing the pumping light intensity, the pumping light intensity was set in this example at a limit value not causing oscillation. When a small microparticle is brought into contact with the portion showing oscillation light, laser oscillation then discontinues and only dim fluorescence is observed. A slight leaking light is also observed in the small microparticle. Contact with a portion other than the oscillating portion did not show any influence on oscillation. These results are attributable to the occurrence of tunnelling of light from coupling of evanescent wave present in water surrounding the cavity with the small microparticle, resulting in a decrease in Q-value of the cavity. As a result, even without contact of the microparticle, tunnelling should occur under the wavelength order, and the Q-value should very considerably as a function of the distance. It is therefore possible to measure the distance at a high accuracy by monitoring the value of mode peak.

A polymer microparticle containing a pigment was trapped in water to confirm laser oscillation therefrom as described above. This microparticle laser illuminant has become a pulse laser having a sufficiently short time interval. Application thereof to time-division spectrometric measurement is also possible. Laser oscillation was stable for a long period of time (at least of the order of several tens of minute) without deterioration of pigment. Changes in laser oscillation caused by light tunnelling between microparticles were measured by using two-beam trapping. Application of this method to STM measurement is possible as well.

With regard to control of focal position of trapping laser for measuring STM, a horizontal accuracy of 10 nm and a vertical (beam axis) accuracy of 0.1 nm are available by acting on the objective magnification which moving the optical system outside the microscops at an accuracy of 1 $\mu$m, for example. These values are sufficient for the present purposes. Displacement of the focal position caused by open air fluctuation is also under these values. The most important error factor is the thermal agitation of the microparticle. On the assumption of the dynamic potential caused by laser trapping of the Gaussian type, with a standard deviation of 1.0 $\mu$m, a maximum horizontal emitting power of 160 pN/W and a maximum vertical emitting power of 64 pN/W (these values are available for a 1-$\mu$m microparticle from rotating manipulation of laser scanning micro-manipulation), the microparticle would show a horizontal fluctuation of 15 nm and a vertical fluctuation of 23 nm, under conditions including a temperature of 300K and a laser power of 145 mW, from Maxwell-Boltzmann distribution. These values may be defined with a distance leading to a probability of coming off therefrom of $e-1$. Increase in fluctuation resulting from a larger particle size may be controlled by increasing the laser power. It is estimated in practice that a positional accuracy of up to 100 nm should be available.

A very high horizontal space resolution (magnitude of light leakage region) cannot naturally be expected from a microparticle of several tens of $\mu$m. There is therefore conceivable a method of bonding a sub-$\mu$m microparticle to the microparticle of several tens of $\mu$m. It a system is configured, in which laser oscillation from the latter is communicated by tunnelling through the sub-$\mu$m microparticle to the sample, a horizontal resolution of about 100 nm is considered available.

EXAMPLE 3

Cross-linking polystylene (Pst) latex microparticles were added to acetone solution of Rh640 ($1.02 \times 10^{-3}$M), and after immersion of pigment solution, the mixture was filtered through a micropore filter. After filtration, the microparticles were sufficiently washed with distilled water, and dispersed in a small amount of distilled water, the resultant product being used as the sample.

Illustration was observed when trapping lasers of 160 mW and 2.2 W were added to Rh640-PSt ([Rh640]=$1.0 \times 10^{-3}$) having a particle size of 8.0 $\mu$m. The latex spheres were identical. Laser trapping was conducted in the both cases. In the case of 160 mW, there was observed illumination (caused by two-photon absorption) only from the irradiated center, whereas, in the case of 2.2 W, illumination from the center of the latex sphere and from the interface between the sphere and water phase was observed. As the latex sphere is laser-trapped, the trapping laser beam is always irradiated onto the center portion of the sphere, and irradiation of 2.2 W laser cause the entire edge of the sphere shines. This is considered to be due to the occurrence of total reflection in the sphere, resulting in laser oscillation (Whispering-Gallery modes).

Figure 10:
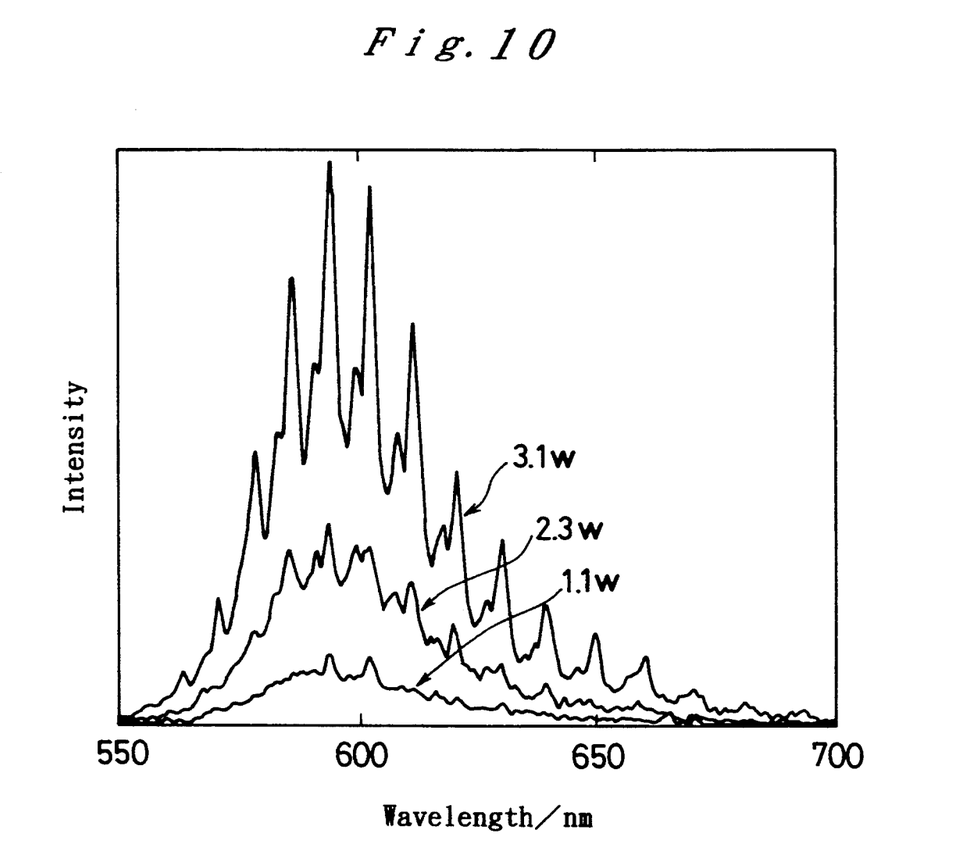
FIG. 10 is a luminous spectral diagram.

The intensity of pumping laser (trapping laser) beam was varied and the spectrum near the sphere-water phase interface was measured for the case of a particle size of 9.4 $\mu$m: a mode structure considered to originate from laser oscillation appeared throughout the entire illumination spectrum (FIG. 10). Careful observation of the spectrum clarifies the presence of a small mode peak near a high mode peak. These peaks are considered to correspond to the longitudinal and transverse modes observed with a Fabry-Perot resonator.

Figure 11:
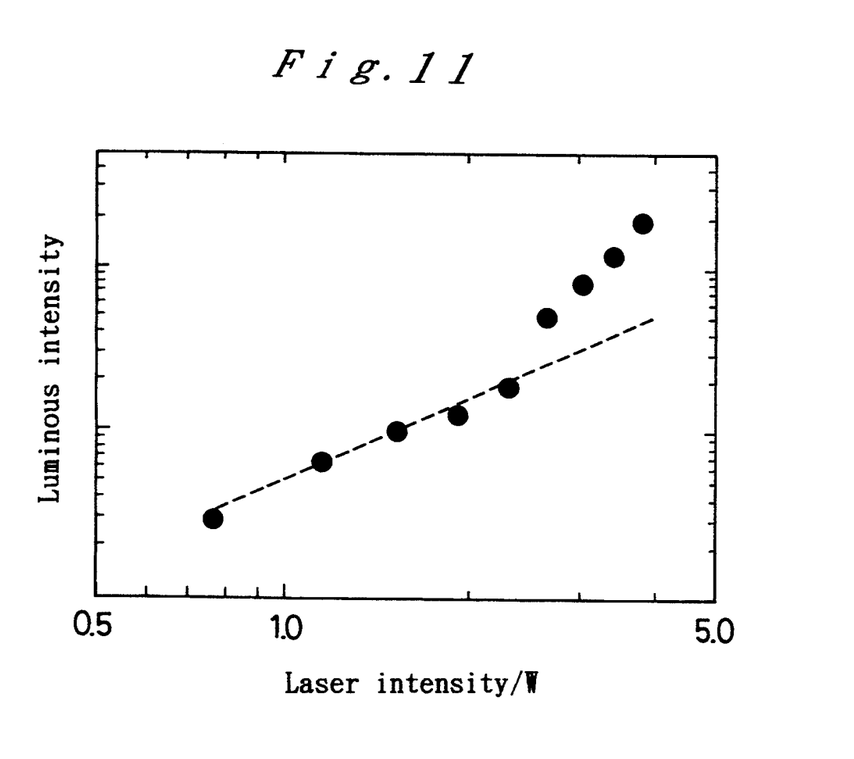
FIG. 11 is a dual-logarithmic diagram illustrating the relationship between the intensity of pumping laser beam and the luminous intensity.

In addition, the dependency of the luminous intensity on the pumping laser beam intensity was examined. Dual-logarithmic plots thereof are shown in FIG. 11. This is the result of use of PSt having a particle size of 8.8 $\mu$m: the slope of the straight line shows a change at a pumping laser beam intensity of 2.1 W. The slope suddenly increases at intensities over 2.1 W, and it is clear that laser oscillation takes place in this region.

According to the present invention, as described above in detail, it is possible to form microilluminants, permitting application to new physical and chemical processes, processing and modification of microparticles, and new developments such as photon STM.

What is claimed is:
1. A microparticle processing method comprising:
    irradiating a first laser beam onto microparticles contained in a liquid medium to trap the microparticles, said microparticles being doped with a pigment irradiating a second laser beam onto the microparticles, while microparticles are trapped by the first laser beam, to cause the microparticles trapped by the first laser beam to be pumped to thereby emit light; and, manipulating the microparaticles within the liquid medium, while said microparticles are caused to emit light in response to the second laser beam, by maneuvering the first laser beam within the liquid medium while said first laser beam traps the microparticles.

2. A method as claimed in claim 1, wherein the microparticles are maneuvered three-dimensionally by the first laser beam.

* * * * *